H. D. PERKY, DEC'D.
L. SPARKS, ADMINISTRATOR.
PROCESS OF MANUFACTURING GRAIN INTO FORM FOR FOOD.
APPLICATION FILED JAN. 19, 1906.

1,019,831.

Patented Mar. 12, 1912.

Witnesses
Stuart Hilder.
George M Anderson

Henry D. Perky
Inventor
Laban Sparks
Administrator
By E. W. Anderson
Attorney

UNITED STATES PATENT OFFICE.

HENRY D. PERKY, OF GLENCOE, MARYLAND; LABAN SPARKS, ADMINISTRATOR OF SAID HENRY D. PERKY, DECEASED, ASSIGNOR, BY MESNE ASSIGNMENTS, TO THE SHREDDED WHEAT COMPANY, OF NIAGARA FALLS, NEW YORK.

PROCESS OF MANUFACTURING GRAIN INTO FORM FOR FOOD.

1,019,831.   Specification of Letters Patent.   Patented Mar. 12, 1912.

Application filed January 19, 1906. Serial No. 296,870.

*To all whom it may concern:*

Be it known that I, HENRY D. PERKY, a citizen of the United States, and resident of Glencoe, in the county of Baltimore and State of Maryland, have made a certain new and useful Invention in Methods or Processes of Manufacturing Grain into Form for Food; and I declare the following to be a full, clear, and exact description of the same, such as will enable others skilled in the art to which it appertains to make and use the invention.

Figure 1:
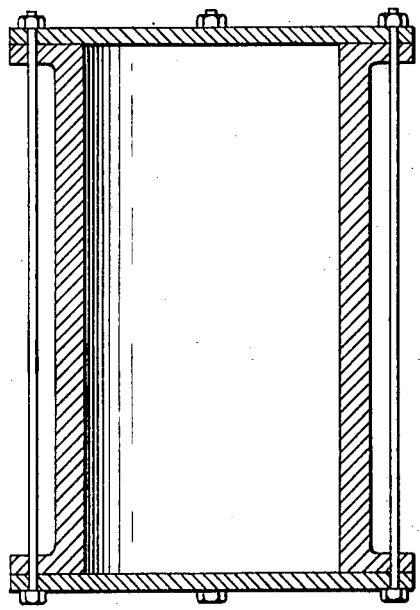
Figure 2:
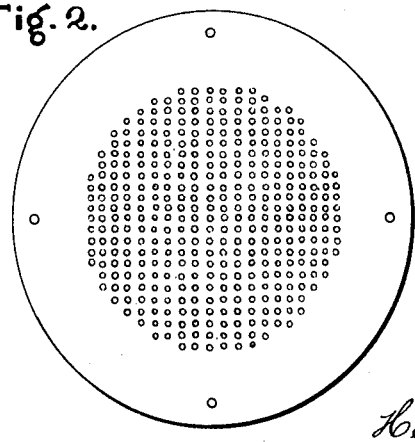

In the accompanying drawings, Figure 1 represents a press cylinder having removable heads. Fig. 2 represents a perforated plate adapted for use in connection with said cylinder.

The object of the invention is to facilitate the preparation of Indian corn or maize, or other grain, in a novel, palatable and attractive form for use as food, and the invention consists in a new process of manufacture, and the product thereof as hereinafter set forth.

In carrying out this invention, the grains are designed to be deprived of their hulls by means of any ordinary process.

In illustrating the invention and its application of corn the grain is ground, and, mixed with a little more water than meal, is cooked in an air-tight or nearly air-tight cylinder, having removable ends or caps, by immersing the cylinder with its contents in boiling water or steam until the cooking is completed. The amount of water in the closed cylinder is designed to be limited to that which will be taken up by the ground material in the cooking. And the closure is designed to cause the material to solidify and to preserve in the cooked article the aroma, and other properties of the corn which might otherwise be carried off or dissipated. The cylinder in which the material is cooked is a press-cylinder.

A press cylinder of proper character and a perforated plate to fit the same are shown in the drawing.

After being cooked, the material is cooled in the cylinder, which is transposed to its seat in a press, the caps or ends of the cylinder being duly removed. The press is provided at one end of the cylinder seat with a follower, designed to be operated by means of a screw or other suitable means for strong pressure, while at the other end of the cylinder seat is provided a removable perforated plate, through which the material in the cylinder is designed to be forced in short lengths which will adhere by their ends to the plate in vertical position. These lengths take the shape of short, externally rough, porous and granular elongated forms or sprays, which are separate and independent of each other, as they do not come in contact during the pressing to adhere together, and they have sufficient rigidity to preserve their position.

The perforated plate being removable from the press, is then transferred with its contents to a drying oven or receptacle in which the filamentous product is dried on the plate from which it is removed for use. To this end the plate with its contents may be taken at once to the table for use, or it may be discharged into a receiver, the contents of which are designed to be used in packing in cartons for the trade.

What I claim as my invention and desire to secure by Letters Patent is—

The process of producing a mass of filamentous food by reducing corn to ground form, cooking the ground corn with a small amount of water, as described, in an air-tight vessel, cooling the resultant until the particles of the mass are set together in solid and fixed relation as a cake within the vessel, forcing the cake of material through a perforated plate to change the relative positions of the particles of the mass and form filaments thereof, keeping these filaments separate and drying the same in loose and independent condition, and finally collecting the separate dried filaments together.

In testimony whereof I affix my signature, in presence of two witnesses.

HENRY D. PERKY.

Witnesses:
 L. S. BURBANK,
 WM C. BREED.